(12) United States Patent
Markham

(10) Patent No.: US 8,276,547 B2
(45) Date of Patent: Oct. 2, 2012

(54) PET TOY WITH THERAPEUTIC FEATURES

(75) Inventor: Joseph P. Markham, Arvada, CO (US)

(73) Assignee: The Kong Company, Golden, CO (US)

( * ) Notice: Subject to any disclaimer, the term of this patent is extended or adjusted under 35 U.S.C. 154(b) by 610 days.

(21) Appl. No.: 11/835,222

(22) Filed: Aug. 7, 2007

(65) Prior Publication Data

US 2009/0038560 A1 Feb. 12, 2009

(51) Int. Cl.
*A01K 29/00* (2006.01)
(52) U.S. Cl. .................................. 119/709; 473/595
(58) Field of Classification Search .................. 119/702, 119/707–711; 433/1, 216; 473/595, 596, 473/612, 614, 597, 573; 446/486; 428/7, 428/11
See application file for complete search history.

(56) References Cited

U.S. PATENT DOCUMENTS

| | | | |
|---|---|---|---|
| 1,187,838 A | 6/1916 | Hughes | |
| 1,515,786 A | 11/1924 | Munro | |
| 2,151,456 A | 3/1939 | Wilhelm | |
| 2,583,400 A | 1/1952 | Wade | |
| 3,956,850 A | 5/1976 | Seidenberg | |
| RE29,050 E | 11/1976 | Hakim | |
| D256,958 S | 9/1980 | Markham | |
| 4,802,444 A | 2/1989 | Markham et al. | |
| D307,339 S | 4/1990 | Markham et al. | |
| D308,122 S | 5/1990 | Markham et al. | |
| 5,088,166 A * | 2/1992 | Lavinio | 24/712 |
| RE34,352 E | 8/1993 | Markham et al. | |
| D344,161 S | 2/1994 | Markham | |
| D349,786 S | 8/1994 | Markham | |
| D373,859 S | 9/1996 | Markham et al. | |
| 5,647,302 A * | 7/1997 | Shipp | 119/709 |
| 5,832,877 A | 11/1998 | Markham | |
| 5,865,146 A | 2/1999 | Markham | |
| 5,904,118 A | 5/1999 | Markham | |
| 5,947,061 A | 9/1999 | Markham et al. | |
| 6,032,387 A * | 3/2000 | Johnson | 36/50.1 |
| 6,112,703 A | 9/2000 | Handelsman | |
| 6,129,053 A | 10/2000 | Markham et al. | |
| 6,216,640 B1 | 4/2001 | Zelinger | |
| D450,249 S * | 11/2001 | Beaver | D9/549 |
| D456,270 S * | 4/2002 | Beaver | D9/549 |
| 6,439,166 B1 | 8/2002 | Markham | |
| 6,546,896 B1 * | 4/2003 | Markham | 119/709 |
| 6,634,970 B2 * | 10/2003 | Jiminez | 473/597 |

(Continued)

OTHER PUBLICATIONS

International Search Report for International (PCT) Patent Application No. PCT/US2008/069589, mailed Nov. 18, 2008.

(Continued)

*Primary Examiner* — Timothy D Collins
*Assistant Examiner* — Brian M O'Hara
(74) *Attorney, Agent, or Firm* — Sheridan Ross P.C.

(57) ABSTRACT

A pet toy includes a plurality of raised features to enhance a dental cleaning action of the animal toy within the animal's mouth. The raised features are provided in groups or sets of linearly extending and uniformly spaced protrusions. The protrusions preferably cover a majority of the outer surface of the pet toy. The distal tips of the protrusions may be roughened in order to enhance dental cleaning. A squeaker may be incorporated within the pet toy by an internal holding pocket that is integrally molded when the pet toy is manufactured. A control element may be used to activate or deactivate the squeaker.

10 Claims, 5 Drawing Sheets

U.S. PATENT DOCUMENTS

| | | |
|---|---|---|
| 7,066,779 B2 | 6/2006 | Willinger |
| 7,096,826 B2 | 8/2006 | Markham |
| 7,144,293 B2 | 12/2006 | Mann et al. |
| RE39,563 E | 4/2007 | Markham |
| 7,201,117 B2 | 4/2007 | Ritchey et al. |
| 7,264,533 B2 | 9/2007 | Chan et al. |
| 2002/0134318 A1 | 9/2002 | Mann et al. |
| 2004/0083983 A1 | 5/2004 | Markham |
| 2004/0089245 A1 | 5/2004 | Markham |
| 2004/0137118 A1* | 7/2004 | Axelrod .................. 426/132 |
| 2006/0099878 A1 | 5/2006 | Willinger |
| 2006/0121822 A1 | 6/2006 | Willinger et al. |
| 2006/0254531 A1 | 11/2006 | Willinger |
| 2007/0015100 A1 | 1/2007 | Morris |
| 2007/0062459 A1 | 3/2007 | Costello et al. |
| 2007/0283900 A1 | 12/2007 | Jager |
| 2007/0287355 A1 | 12/2007 | Jager |
| 2008/0314331 A1* | 12/2008 | DeGhionno .................. 119/709 |
| 2009/0038559 A1 | 2/2009 | Markham |

OTHER PUBLICATIONS

Written Opinion for International (PCT) Patent Application No. PCT/US2008/069589, mailed Nov. 18, 2008.

International Preliminary Report on Patentability for International (PCT) Patent Application No. PCT/US2008/069589, mailed Feb. 18, 2010.

U.S. Appl. No. 13/108,586, filed May 16, 2011, Markham.

Official Action for Canada Patent Application No. 2695627, dated May 10, 2011 2 pages.

* cited by examiner

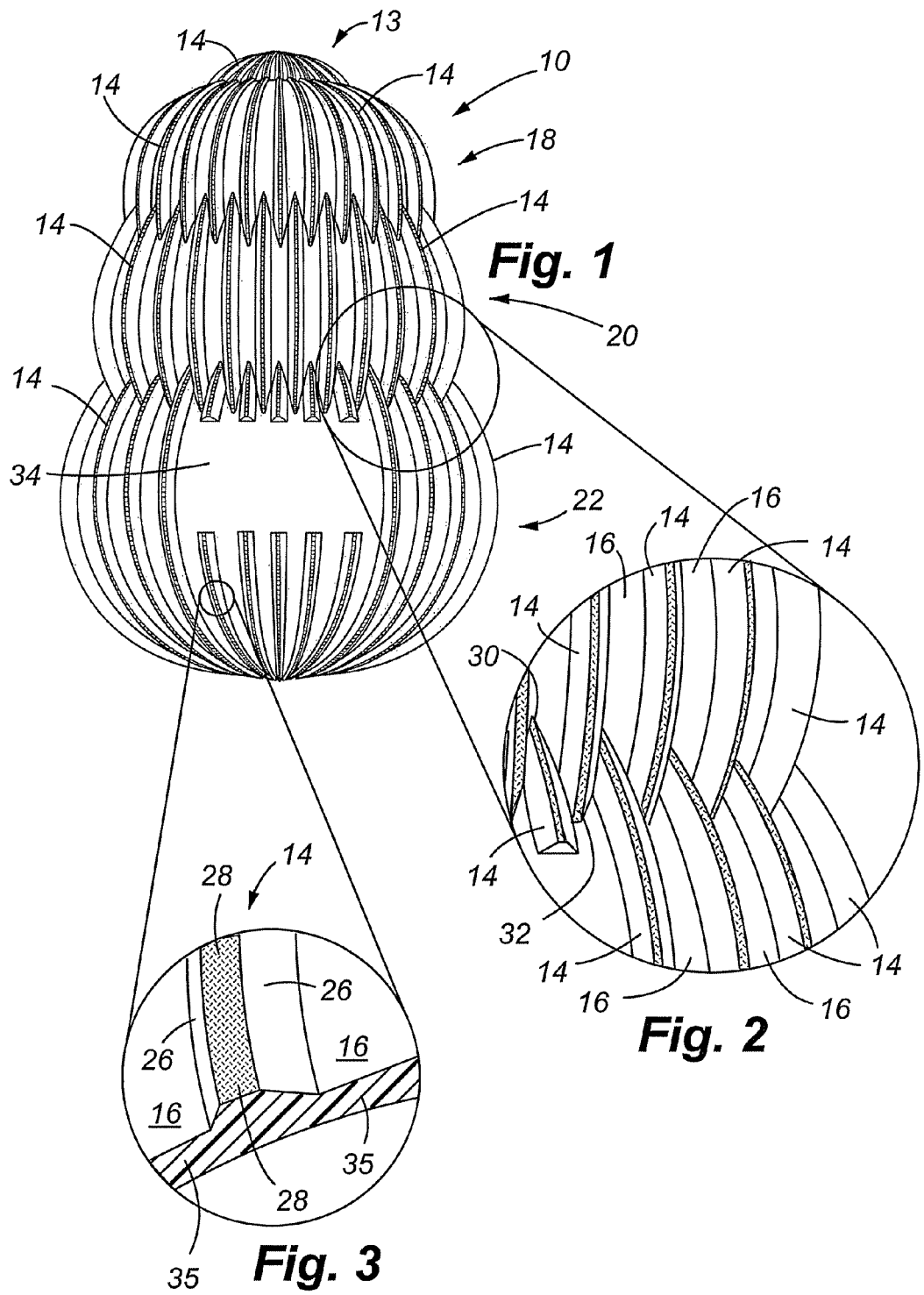

PET TOY WITH THERAPEUTIC FEATURES

FIELD OF THE INVENTION

The present invention relates to pet toys, and more particularly, to a pet toy having therapeutic features on the outer surface of the toy that stimulates dental cleaning of the animal's teeth and gums, and the animal toy also having a noise making feature that may be selectively disabled to prevent the noise making feature from operating.

BACKGROUND OF THE INVENTION

Chewable pet toys have been available for many years. Rubber or plastic is the preferred material for chewable pet toys, and there are a tremendous number of different shaped pet toys, some of which incorporate features to clean the teeth and gums of the animal as the animal chews on the toy.

One example of a patent that discloses a pet toy with features formed on the outer surface of the toy to clean an animal's teeth and gums is the U.S. Pat. No. 6,439,166. This reference discloses an animal toy with raised features formed on the outer surface of the toy of various shapes and designs. The raised features may also have differing tips or ends that also have beneficial effects on the animal's mouth for dental cleaning.

Another patent reference that discloses a pet toy intended for dental cleaning is the U.S. Pat. No. 4,802,444. This reference discloses more specifically a pet toy made of an elastomeric material, and grooves formed on the outer surface of the toy that are sized and configured so that an animal that bites down on the toy will have its teeth and gums cleaned because the groove collapses around the teeth and gums.

Yet another patent reference disclosing a pet toy including features for cleaning the animal's teeth and gums is U.S. Pat. No. 5,865,146. The pet toy disclosed in this reference is characterized by an elongated hollow body, and a pair of spaced bulbous sections, each having a sidewall of substantially constant cross sections throughout. A plurality of longitudinally spaced angular ribs extend around the periphery of the bulbous sections forming grooves to facilitate an animal gripping the toy with its teeth. When the teeth of the animal deform the pet toy, the ribs deflect inwardly to clean the teeth and gums of the animal.

While these references may be adequate for their intended purpose, there is still a need for a pet toy that is especially adapted for providing dental cleaning wherein dental cleaning features are disposed on substantially all of the outer surface of the toy to ensure that despite the angle at which the animal may bite on the toy, the dental cleaning features will result in some stimulation of the teeth and gums of the animal. There is also a need to provide a pet toy with dental cleaning features wherein the cleaning features are of a robust design such that they are not easily torn off by the biting action of the animal, and further wherein the arrangement of the dental cleaning features do not detract from the structural integrity of the toy.

Another common feature with many pet toys is the provision of a noise-producing element such as a squeaker that produces a sound as the animal bites down on the toy. There are a number of problems associated with providing squeakers in a pet toy, such as the animal choking on the squeaker after it has been removed by the animal during play with the toy. One natural behavior for many animals is to make an attempt to "kill" the toy by gaining access to the squeaker, which can result in the undesirable choking or aspiration of the squeaker. Another problem associated with squeakers is that the noise produced can, over time, be a nuisance to the pet owner who wishes for the toy to be silent at selected times. Therefore, there is a need for a pet toy such that the squeaker is securely mounted within the pet toy and is difficult to access by the pet, yet the squeaker may be selectively disabled to quiet the pet toy at desired times.

SUMMARY OF THE INVENTION

In accordance with the present invention, an animal or pet toy is provided having a plurality of raised features formed on the outer surface of the toy for purposes of providing dental cleaning to the animal's teeth and gums. The raised features in the preferred embodiments are ribs or protrusions that extend in a linear fashion around substantially the entire outer surface of the pet toy. The ribs or protrusions are spaced from one another along the outer surface of the pet toy, and the space or gaps between the ribs may be defined as channels or grooves.

In the preferred embodiments, the ribs or protrusions are spaced uniformly from one another on the outer surface of the pet toy. Depending upon the particular shape of the pet toy, there may be groups or sets of protrusions that intersect with other groups or sets of protrusions. At the points of intersection, the protrusions may overlap, thereby providing additional structural strength to the pet toy in general, as well as to further stabilize a connection between the protrusions and the outer surface of the pet toy. These points of intersection also provide further enhanced dental cleaning since the overlapping configuration of the protrusions are provided in a manner to contact the animal's teeth and gums at different angles.

The animal toy is preferably made of a resilient, elastomeric material that prevents it from being destroyed when chewed on by the animal.

The inner surface of the pet toy defines a substantially hollow core. The thickness of the pet toy is defined by a sidewall that is substantially uniform. The sidewall is selected from a thickness that allows the pet toy to collapse a desired amount when an animal bites down on the pet toy. As the pet toy collapses under pressure, the protrusions therefore change their angle with respect to the animal's mouth, thereby providing additional cleaning benefits. Depending upon the type of animal using the toy, the thickness can be varied to provide a desired amount of rigidity or resiliency for limiting or increasing the degree of collapse that occurs.

Preferably, the protrusions extend perpendicularly away from the outer surface of the pet toy. As disclosed in the preferred embodiments, rounded or curved outer surfaces of the pet toy results in the protrusions extending away from the outer surfaces of the animal toy in a multitude of different angles. These multitude of different angles coupled with substantially the entire outer surface of the pet toy having the protrusions result in an increased chance that one or more of the protrusions will contact different tooth and gum surfaces of the animal's mouth.

Primary dental cleaning occurs when the teeth and gums of the animal contact the protrusions, and the protrusions are bent or deflected as they contact the animal's teeth and gums. The protrusions can be made more or less rigid, thus resulting in the desired degree of deflection as the animal's mouth comes into contact with the protrusions. The degree of resiliency of the material can also be varied to achieve the desired dental cleaning effect.

In yet another aspect of the present invention, food treats may be placed in the grooves in order to further entice the animal to play with the pet toy. The pet treats may include a paste-like material such as liver paste or peanut butter, which will be retained within the grooves. Toothpaste can also be used between the grooves to further assist in dental cleaning.

Also in the preferred embodiments, the particular shape of the protrusions can be chosen to maximize the intended purpose of the toy. In the preferred embodiments, the protrusions each have a pair of sidewalls that extend substantially perpendicular to the outer surface of the pet toy. The sidewalls may extend substantially parallel to one another, or the most outer edges of the side walls may converge towards one another resulting in a triangular shaped cross section. The distal tip or edge of the protrusions may be roughened, similar to a knurled finish, wherein the roughened tips or edges further assist in dental cleaning.

In yet another aspect of the present invention, an internal holding pocket is provided for placement of a squeaker. The squeaker is provided with a control element that enables the pet owner to control activation or deactivation of the squeaker. Manipulation of the control element can be achieved by a simple tool that is able to move the control element between an engaged and disengaged position with respect to the squeaker.

Additional features and advantages of the present invention will become apparent from the detailed description that follows, taken in conjunction with the accompanying drawings.

BRIEF DESCRIPTION OF THE DRAWINGS

FIG. 1 is a perspective view of the first embodiment of the present invention;

FIG. 2 is a greatly enlarged portion of FIG. 1;

FIG. 3 is another greatly enlarged portion of FIG. 1;

DETAILED DESCRIPTION OF THE DRAWINGS

Figure 4:
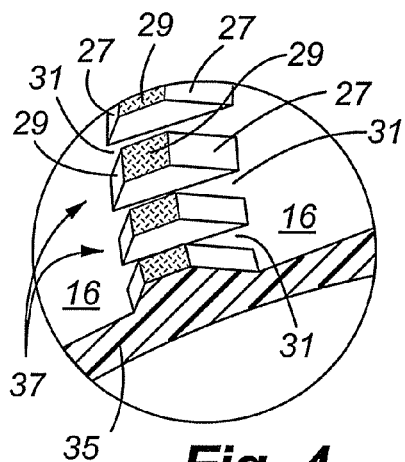
FIGS. 4-7 each illustrate a greatly enlarged portion of FIG. 1 in various embodiments of the invention corresponding to different types of protrusions.

FIG. 1 illustrates the first embodiment of the pet toy 10 of the present invention. In the first embodiment, the pet toy 10 shows a plurality of raised features 14 in the form of ribs or protrusions that extend away from the outer surface of the pet toy. The protrusions 14 extend linearly in groups or sets of protrusions, and the protrusions are uniformly spaced from one another in each group or set. In each of the embodiments, the groups or sets of protrusions can extend along a desired section or portion of the pet toy, and depending upon the portion of the pet toy upon which the sets of protrusions lie, the protrusions can be either substantially equal in length as they extend along the outer surface of the pet toy, or may be dissimilar in length. The particular shape of the pet toy 10 resembles the Kong® pet toy shape. A first group or set of protrusions 14 are disposed along a most upper portion or section 13 of the pet toy. Another set or group of protrusions are disposed along the upper middle section 18 of the pet toy that is located below section 13. Another set or group of protrusions 14 are disposed along the lower middle layer or section 20 of the pet toy. Yet another group or set of protrusions 14 are disposed along the lower layer or section 22 of the pet toy. Starting from the upper section, each section is progressively larger and each section has a generally rounded or bulbous shape.

Referring also to the FIGS. 2 and 3, further structural details of the protrusions 14 are shown. A plurality of grooves or channels 16 may be defined as the gaps between respective pairs of protrusions 14. Referring to FIG. 3, each of the protrusions includes a pair of sidewalls 26 and a most distal tip or surface 28. The sidewalls 26 can extend substantially parallel to one another, or the sidewalls 26 may taper toward one another at the surface 28. In order to enhance the cleaning of the animal's teeth and gums, the surface 28 may have a knurled or roughened finish as shown. The knurled finish provides some abrasiveness that removes plaque from the teeth and gums of the animal.

Preferably, the protrusions have a height that extends substantially perpendicular from the outer surface of the pet toy. Accordingly, the protrusions generally follow the shape or contour of the outer surface of the pet toy. In the case of FIG. 1, the compound shape of the pet toy results in the protrusions extending at multiple different angles away from the outer surface of the pet toy, thereby increasing the chance that an animal's teeth and gums will be cleaned through contact with the various angles protrusions.

Optionally, an open area or gap 34 may be formed on the pet toy wherein the outer surface of the pet toy is exposed, and no protrusions are found in that open area. This open area may facilitate placement of a trademark or other product identifying information.

Referring to FIG. 2, it is shown that the intersection or overlap of two abutting sets of protrusions results in yet a different angular configuration of raised features. Thus, additional cleaning benefits may be realized by this area of intersection. Additionally, the overlap of the protrusions adds some amount of structural strength to the pet toy. As shown in FIG. 2, one end 30 of a protrusion 14 extends beyond an opposing end 32 of the adjacent protrusion 14 thereby creating the overlapping configuration.

Referring to FIGS. 4 through 7, various other embodiments are shown corresponding to different types of protrusions 14. Each of the different types of protrusions may provide dental cleaning benefits. In the embodiment of FIG. 4, the protrusions 14 each have a pair of sidewalls 27, a most distal tip or surface 29, and gaps or separations 31 between each individual segment or part 37. The segments are longitudinally aligned therefore presenting the appearance of a single continuous protrusion when viewed from a distance.

Figure 5:
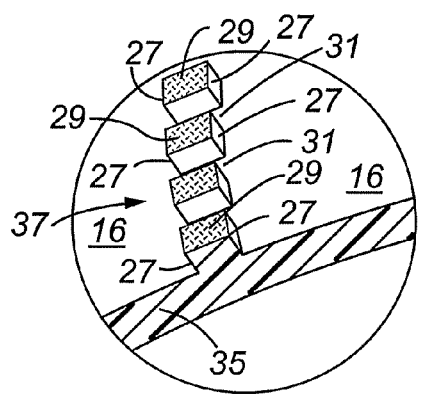

Referring to FIG. 5, another configuration is shown for the protrusions 14, the same reference numbers corresponding to similar structures shown in FIG. 4. Thus, in FIG. 5 the protrusions 14 also include a pair of sidewalls 27, a most distal tip or surface 29, and a gap or space 31 between each protrusion 14. In FIG. 5, sidewalls are substantially extending perpendicular from the external surface of the pet toy.

Figure 6:
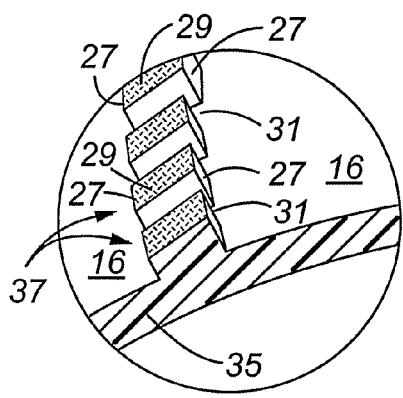

Referring to FIG. 6, yet another configuration is shown of the protrusions 14. Again, the same reference numbers are provided to denote similar structures in this configuration. As shown, the pair of sidewalls 27 extends substantially perpendicular from the outer surface of the pet toy, but the most distal tip or surface 29 is angled or tapered.

Figure 7:
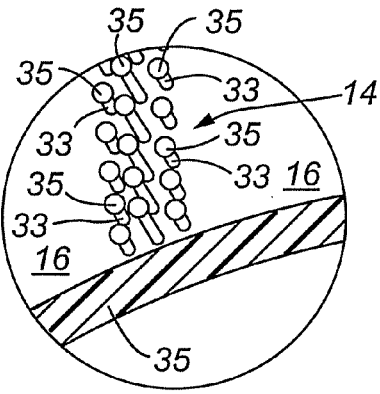

Referring to FIG. 7, yet another configuration is shown for the protrusions. The protrusions in this embodiment substantially differ from the other embodiments in that the plurality of protrusions 14 include individual extensions 33 spaced from one another, and wherein each extension 33 includes a tubular or cylindrical base, and a bulbous shaped tip 35. The extensions 33 may be configured in rows or columns and in the example of FIG. 7, the central column extends somewhat beyond the columns on both sides of the central column.

Figure 8:
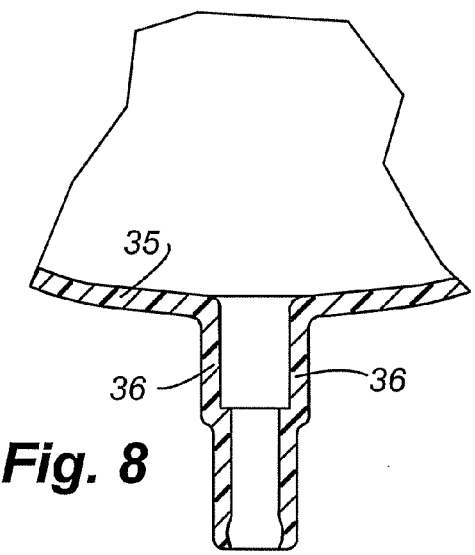
FIG. 8 is a fragmentary enlarged cross-section of FIG. 1 illustrating an internal holding pocket in a reversed position directly after manufacture wherein the mold used to make the pet toy results in the holding pocket extending away from the body of the pet toy.

FIG. 8 illustrates a structure that forms an internal holding pocket that receives a noise-making instrument, as discussed below with respect to FIGS. 9, 10 and 12. In the manufacturing process, it may be easier to provide a mold wherein the internal holding pocket is formed by reversing the sidewalls 36 that form the internal holding pocket.

Figure 9:
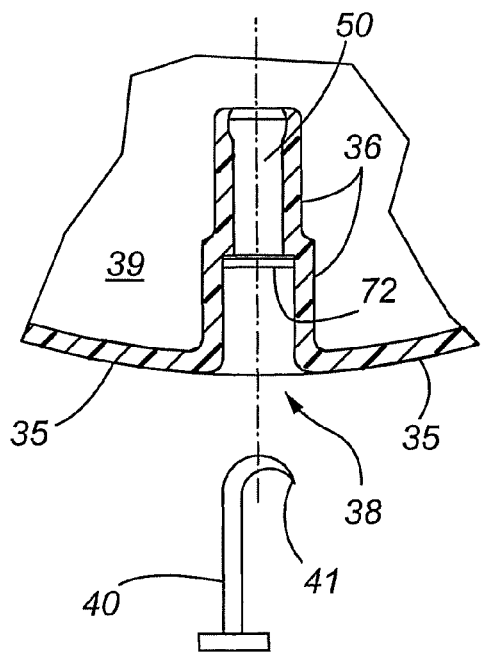
FIG. 9 is a fragmentary enlarged cross-section of FIG. 1 illustrating the internal holding pocket placed in its normal position and illustrating a squeaker placed in the internal holding pocket.

Now referring to FIG. 9, in another aspect of the invention, the internal holding pocket 38 is illustrated that receives the noise-making instrument, such as a squeaker 50. In FIG. 9, the sidewalls have been reversed by pushing them within the interior or core 39 of the pet toy. The internal holding pocket 38 is integrally molded with the sidewall 35 of the pet toy. Therefore, the internal holding pocket 38 is not a separate element that is attached to the pet toy and rather, can be integrally formed during the molding process for making the pet toy. The internal holding pocket 38 includes the internal sidewalls 36 defining a chamber or opening that frictionally receives the squeaker 50. In the particular configuration shown in FIG. 9, the internal holding pocket 38 has a two-tiered internal diameter that accommodates activation or deactivation of the squeaker 50, as discussed further below.

Figure 10:
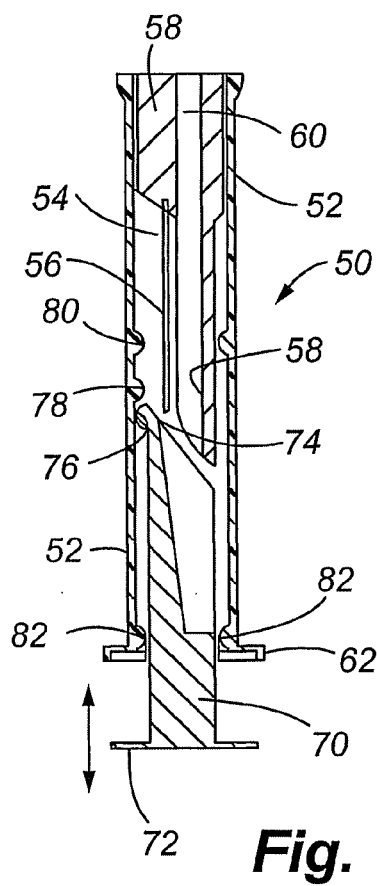
FIG. 10 is an enlarged cross sectional view of a squeaker and control element that activates or deactivates the squeaker.

Referring to FIG. 10, the squeaker 50 is illustrated along with a control element 70 that is used to activate or deactivate the squeaker. As well understood by those skilled in the art, a common squeaker is a simplified musical instrument, typically in the form of a single reed instrument wherein a very thin reed is secured against an aperture. When air is forced between the reed and the body of the squeaker surrounding the reed, the reed vibrates thus producing a sound. In FIG. 10, the squeaker 50 more particularly includes a body 52 that encloses a chamber 54. A reed 56 is secured to the body and extends within the chamber 54. The front portion 58 of the squeaker includes an air passage 60 that communicates with the chamber 54. When air is forced through the air passage 60 into the chamber 54, the reed 56 vibrates to produce a sound. The squeaker 50 also includes a flange or rim 62 with a slightly larger diameter than a diameter of the body 52. The flange 62 is seated against the ledge separating the smaller and larger sidewalls 36.

The control element 70 is a tubular member having a flange 72 and a forward contacting edge 74. A tab 76 forms the most distal part of the control element. Disposed on the interior surface of the body 52 are at least two detents 78 and 80. If it is desired to deactivate or inhibit operation of the squeaker 50, the control element 70 is fully inserted within the body 52 such that the forward contacting edge 74 makes contact with the reed 56, thereby preventing the reed from vibrating. In this position, the tab 76 is disposed between detents 78 and 80, thereby holding the control element in a locked position. If it is desired to activate the squeaker, the control element 70 is withdrawn from the body 52 such that the tab 76 resides on the opposite side of detent 78 and the forward contacting edge 74 does not make contact with the reed 56, thereby allowing the reed to freely vibrate when air passes through the passage 60. Another pair of detents 82 may be formed on the interior surface of the body 52. These detents 82 serve to provide some frictional engagement of the body 52 against the control element 70 such that when the control element is withdrawn as shown in FIG. 10, the control element will not completely slide out of the body 52. As shown in FIG. 9, a simple tool 40 may be used to move the position of the control element in order to activate or deactivate the squeaker 50. The hook portion 41 of the tool can be used to push or pull the control element to the desired position.

Figure 11:
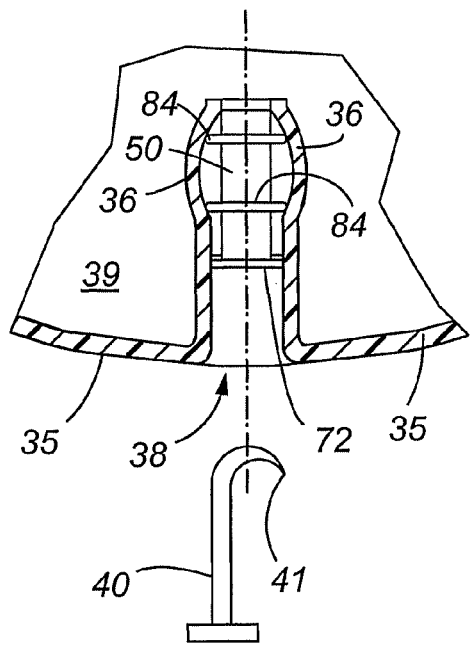
FIG. 11 is another fragmentary cross section illustrating an alternative construction for the internal holding pocket and squeaker.

FIG. 11 illustrates a different arrangement for the internal holding pocket 38 wherein instead of the internal holding pocket defining a substantially cylindrical opening or gap, the internal holding pocket 38 defines a bulbous shaped chamber, and ribs 84 formed on the outer surface of the squeaker 50 are used to frictionally engage the sidewalls 36 of the internal holding pocket to prevent the squeaker 50 from being removed.

Figure 12:
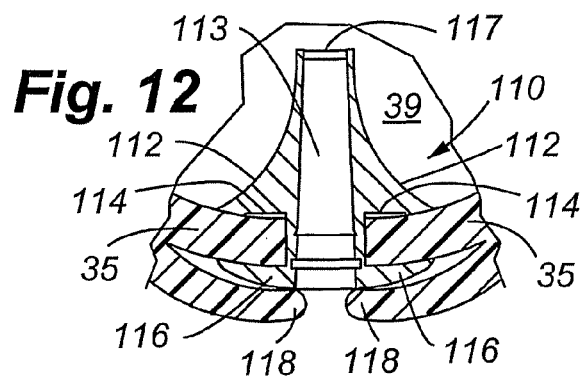
FIG. 12 is another fragmentary cross-section illustrating an alternative construction for a squeaker, as well as an alternative construction for the internal holding pocket.
Figure 13:
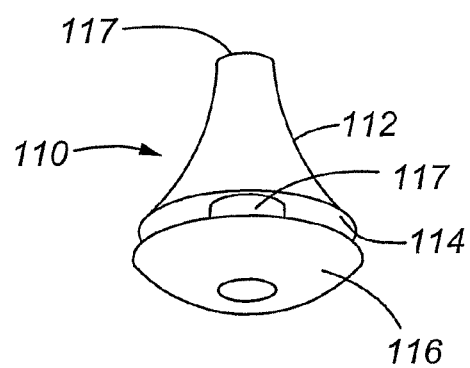
FIG. 13 is a perspective view of the squeaker shown installed in FIG. 12.

FIGS. 12 and 13 illustrates another embodiment of the present invention including a different construction for a noise-making instrument/squeaker 110, as well as a different structure for holding the noise-making instrument within the pet toy. In this embodiment, a pair of converging lips or extensions 118 extends from the sidewall 35 of the pet toy. The noise-making instrument/squeaker 110 includes a body or housing 112, a rim or flange 116 that resides in the gap or space between the sidewall 35 and the converging lips 118, and a neck 117 interconnecting the body 112 and rim 116. The squeaker 110 extends through the opening formed in the sidewall. The body 112 houses a central portion 113 that contains the noise-making features, such as shown in the embodiment in FIG. 10. Preferably, central portion 113 is the actual noise making feature that is inserted within the housing 112. To install the squeaker 110, the distal end 117 of the squeaker is first inserted in the space or gap between the converging lips 118, then the squeaker 110 is pressed such surface 114 resides on the interior surface of the sidewall 35, and the rim 116 reside on the exterior side of the sidewall 35. The gap or space between the sidewall 35 and the converging lips 118 may be sized to allow the control element to be activated or deactivated as necessary. The converging lips 118 help to cover access to the squeaker thereby ensuring that the squeaker is not inadvertently removed by the play action of the animal. Preferably, the housing 112 and rim 116 is an integral unit made of an elastomeric material such as rubber. The central portion 113 defining the noise-making component may be constructed of a plastic material. Thus, the squeaker 110 can be considered a two-part element.

Figure 14:
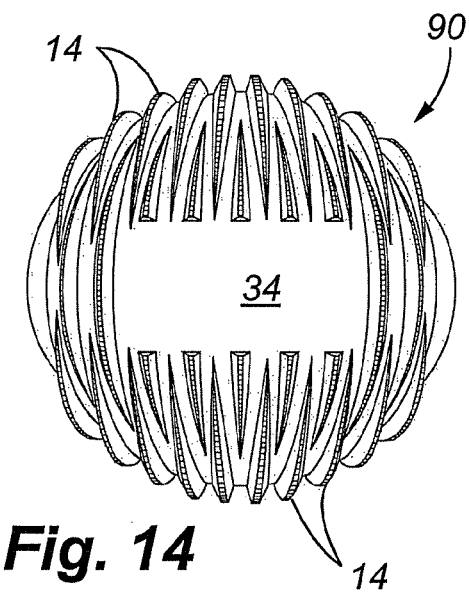
FIG. 14 is a perspective view illustrating another preferred embodiment of the present invention.

FIG. 14 illustrates yet another embodiment of the present invention showing a pet toy 90 that is spherical shaped. Like the first embodiment, a plurality of protrusions 14 are provided and some overlap occurs between different sets or groups of protrusions.

Figure 15:
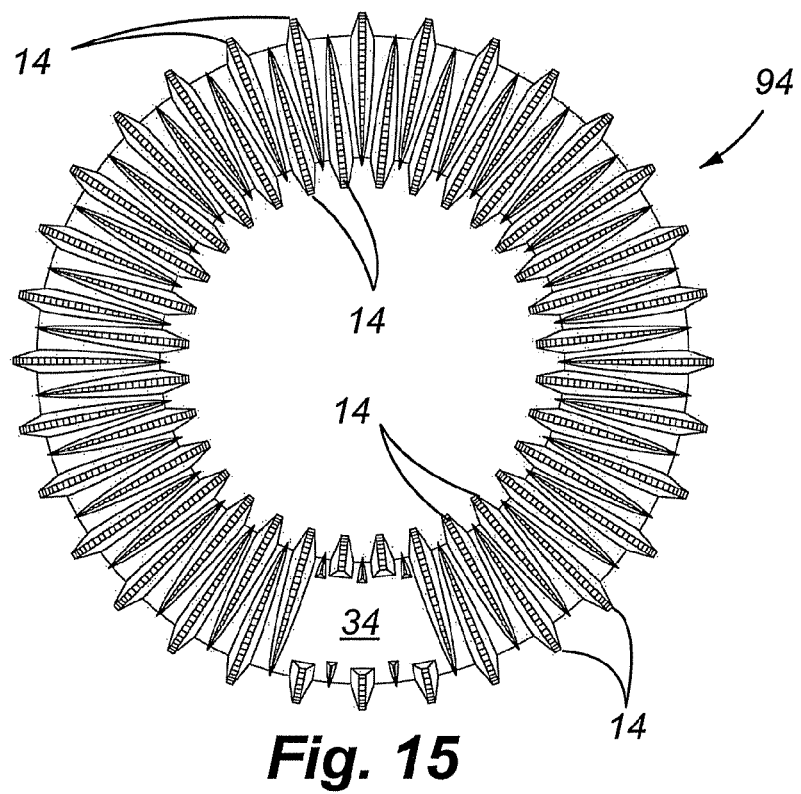
FIG. 15 is a plan view illustrating another embodiment of the present invention.

FIG. 15 illustrates yet another embodiment showing a pet toy 94 that has a ring shape. In this embodiment, the plurality of protrusions 14 include one set or group that are disposed on the outer peripheral edge of the pet toy, and an opposing set or group of protrusions 14 are disposed on the inner or interior surface and wherein the respective sets of protrusions alternately overlap one another along the entire periphery of the pet toy.

Figure 16:
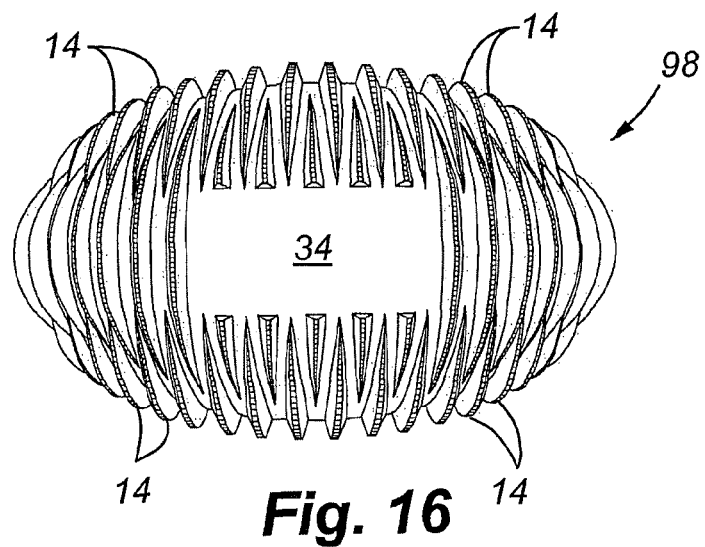
FIG. 16 is a side elevation view illustrating yet another preferred embodiment of the present invention.

FIG. 16 illustrates yet another preferred embodiment of the present invention wherein the pet toy 98 has an oval shape resembling a football or egg. This embodiment also has respective sets or groups of protrusions 14 that intersect one another along the outer surface of the pet toy. In the embodiments of FIGS. 7 and 9, there are two areas of intersection shown between the respective sets of protrusions.

Figure 17:
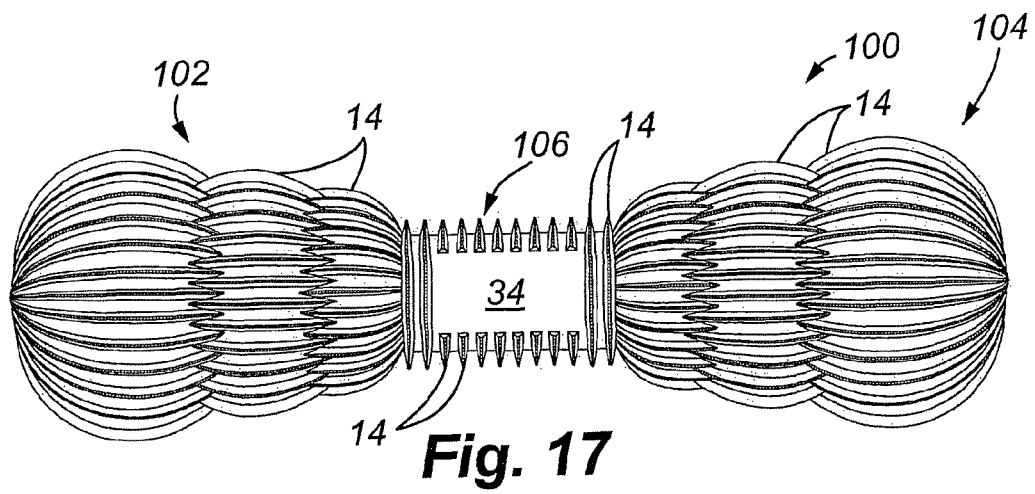
FIG. 17 is another side elevation view illustrating yet another preferred embodiment of the present invention.

FIG. 17 illustrates yet another preferred embodiment of the present invention wherein a pet toy 100 includes three distinct parts; namely, end parts 102 and 104, and an interconnecting bridge or centerpiece 106. Parts 102 and 104 have substantially the same shape as the first embodiment. Thus, FIG. 17 resembles a dumbbell. The plurality of protrusions formed on the centerpiece or bridge 106 extend substantially perpendicular with respect to the direction of the protrusions 14 formed on parts 102 and 104.

In the embodiments of FIGS. 14-17, the optional open areas 34 may also be provided to place a trademark or other product identifying information.

The pet toy of the present invention can be made of a resilient, flexible, material such as plastic, or from an elastomeric material such as rubber that prevents the animal toy from being consumed by the animal, and also helps to achieve the desired type of dental cleaning action in the animal's mouth. The toy is preferably made of a material flexible enough so that when the animal bites down on the animal toy, the sidewall of the animal toy is allowed to deform or deflect, allowing the protrusions to shift or collapse in different directions thereby providing a scraping motion or movement which further helps to clean the animal's mouth.

From the foregoing, the advantages of the present invention are readily apparent. An animal or pet toy is provided that has a plurality of protrusions that result in dental cleaning. The particular arrangement of the protrusions and overlapping regions between sets of the protrusions further adds to dental cleaning capability and also can add to the structural strength of the pet toy. Selectively controlling the activation or deactivation of the squeaker is achieved by the use of a control element that may be easily manipulated by a user. The squeaker is located within a protected internal holding pocket such that it is very difficult for the animal to remove the squeaker.

What is claimed is:

1. An animal toy with therapeutic features for dental cleaning of an animal's teeth and gums, comprising:
a resilient, elastomeric body member having an outer surface, and an inner surface defining a substantially hollow core;
a plurality of protrusions formed integrally with said outer surface and being exposed around substantially all of a periphery of said outer surface for contacting the teeth and gums, said protrusions extending substantially linear along the surface of the pet toy and substantially parallel to one another, and spaced substantially uniformly from one another, each of said protrusions including a pair of opposed sidewalls, and a most distal surface;
a first protrusion of said plurality of protrusions has first and second ends;
a second protrusion of said plurality of protrusions has first and second ends, and wherein at least said first and second protrusions extend along a longitudinal length of said toy; and
wherein the first end of said first protrusion overlaps the first end of said second protrusion, thereby providing structural strength to the toy and further wherein the second ends extend away from one another in substantially opposite directions.

2. An animal toy, as claimed in claim 1, wherein:
said most distal surface is substantially flat.

3. An animal toy, as claimed in claim 1, wherein:
said distal surface has a roughened finish.

4. An animal toy, as claimed in claim 1, wherein:
said pet toy includes a plurality of sections including at least two of an upper section, an upper middle section, a middle section, and a lower section, and wherein said plurality of protrusions extend linearly along each of said at least two sections.

5. An animal toy, as claimed in claim 1, wherein:
said plurality of protrusions are arranged in groups of protrusions extending substantially linearly along said outer surface and said groups of protrusions being uniformly spaced from one another in each group.

6. An animal toy, as claimed in claim 1, wherein:
said outer surface comprises sections having different shapes and sizes, and one set of protrusions from said plurality of sets of protrusions are placed on a corresponding section.

7. An animal toy, as claimed in claim 1, wherein:
said pair of opposed sidewalls extend substantially parallel to one another.

8. An animal toy, as claimed in claim 1, wherein:
said first protrusion includes a plurality of the first protrusions having substantially equal lengths, and said second protrusion includes a plurality of second protrusions each having a substantially equal length, wherein first ends of said plurality of first protrusions overlap corresponding first ends of said plurality of second protrusions.

9. An animal toy with therapeutic features for dental cleaning of an animal's teeth and gums, comprising:
a resilient elastomeric body member having an outer surface;
a plurality of protrusions formed integrally with and around substantially all of a periphery of said outer surface and being exposed for contacting the teeth and gums and extending substantially linear along the outer surface and substantially parallel to one another;
a first protrusion of said plurality of protrusions having first and second ends;
a second protrusion of said protrusions having first and second ends, and wherein at least said first and second protrusions extend along a longitudinal length of said toy; and
wherein a first end of said first protrusion overlaps a first end of said second protrusion; and further wherein the second ends extend away from one another in substantially opposite directions.

10. An animal toy with therapeutic features for dental cleaning of an animal's teeth and gums, comprising:
a resilient elastomeric body member having an outer surface, and an inner surface defining a substantially hollow core;
a plurality of protrusions formed integrally with said outer surface and being exposed around substantially all of a periphery of said outer surface for contacting the teeth and gums, said protrusions extending substantially linear along the surface of the pet toy and substantially parallel to one another, and spaced substantially uniformly from one another, each of said protrusions including a pair of opposed sidewalls, and a most distal surface, wherein said most distal surface is roughened;

a first protrusion of said plurality of protrusions has first and second ends;

a second protrusion of said plurality of protrusions has first and second ends, and wherein at least said first and second protrusions extend along a longitudinal length of said toy; and wherein the first end of said first protrusion overlaps the first end of said second protrusion, thereby providing structural strength to the toy and further wherein the second ends extend away from one another in substantially opposite directions.

* * * * *